United States Patent
Ming

(10) Patent No.: US 7,567,729 B2
(45) Date of Patent: *Jul. 28, 2009

(54) PHOTO IMAGE MATCHING METHOD AND APPARATUS

(75) Inventor: Wei Ming, Cupertino, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 11/231,769

(22) Filed: Sep. 22, 2005

(65) Prior Publication Data

US 2007/0065040 A1 Mar. 22, 2007

(51) Int. Cl.
G06K 9/36 (2006.01)

(52) U.S. Cl. .................. 382/284; 382/294

(58) Field of Classification Search ......... 382/284–290, 382/173–178, 190–208, 294; 358/450, 462
See application file for complete search history.

(56) References Cited

U.S. PATENT DOCUMENTS

| | | | | |
|---|---|---|---|---|
| 4,272,756 | A * | 6/1981 | Kakumoto et al. | 340/146.3 H |
| 5,675,672 | A * | 10/1997 | Nakabayashi | 382/318 |
| 6,285,329 | B1 * | 9/2001 | Nagaev | 343/702 |
| 6,304,313 | B1 * | 10/2001 | Honma | 355/18 |
| 6,493,469 | B1 * | 12/2002 | Taylor et al. | 382/284 |
| 6,594,403 | B1 * | 7/2003 | Bozdagi et al. | 382/284 |
| 2001/0019636 | A1 * | 9/2001 | Slatter | 382/284 |
| 2002/0041717 | A1 * | 4/2002 | Murata et al. | 382/275 |
| 2002/0057848 | A1 * | 5/2002 | Tan et al. | 382/284 |
| 2002/0126890 | A1 * | 9/2002 | Katayama et al. | 382/154 |
| 2002/0159636 | A1 * | 10/2002 | Lienhart et al. | 382/176 |
| 2003/0169923 | A1 * | 9/2003 | Butterworth | 382/181 |
| 2007/0067713 | A1 * | 3/2007 | Ming | 715/511 |

FOREIGN PATENT DOCUMENTS

WO WO 01/95109 A2 * 12/2001

OTHER PUBLICATIONS

Lienhart et al. "The Localizing and Segmenting Text in Images and Videos." IEEE Transactions on Circuits and Systems for Video Technology, vol. 12, No. 4, Apr. 2002, pp. 256-268.*
Linhong et al., "A Stitching Algorithm of Still Pictures with Camera Translation" Proceedings of the First International Symposium on Cyber Worlds, 2002, pp. 1-7.*

* cited by examiner

*Primary Examiner*—Andrew W Johns
(74) *Attorney, Agent, or Firm*—Finnegan, Henderson, Farabow, Garrett & Dunner, L.L.P.

(57) ABSTRACT

A method and apparatus for matching two images having areas of overlapping text, first image data, and second image data is provided. The method includes dividing the first image data into a plurality of scene segments and dividing the second image data into a plurality of scene segments, finding a text segment among the scene segments of the first image data and second image data, and detecting common text data in the text segments of the first image data and the second image data, the common text data having identical text data in the text segments of the first image data and the second image data. The method further includes extracting feature points from the first image data and the second image data based on the common text data, and combining the first image data and the second image data according to the feature points.

5 Claims, 7 Drawing Sheets

PHOTO IMAGE MATCHING METHOD AND APPARATUS

FIELD

The present invention relates to a method and/or an apparatus which matches several documents having at least a common area.

INTRODUCTION

It has been difficult to stitch two images correctly in a conventional image processing algorithm. Therefore, when an user would like to copy a large image such as a photographic image which is too large to copy the whole image at a time, it is difficult to obtain a reduced copy of the whole image because of the difficulty of stitching.

Therefore, it is desirable that it is easy to correctly match two images having at least some overlap area.

SUMMARY

According to various embodiments, the present teachings can provide an image processing apparatus. The image processing apparatus can match two images including a text, a first image data and a second image data, having at least some overlap area including text. The image processing apparatus can comprise a text segment finding unit, a common text data finding unit, a feature point finding unit and an image combining unit.

The text segment finding unit can divide the first image data into several scene segments, divide the second image data into several scene segments, and detect a text segment among the scene segments of the first image data and second image data.

The common text data finding unit can detect text data included in the text segments of the first image data and the second image data, and decide common text data in the text segment of the first image data and the second image data. The common text data has same text data in the text segments of the first image data and the second image data.

The feature point finding unit can extract feature points from the first image data and the second image data based on the common text data.

The image combining unit can combine the first image data and the second image data according to the feature points.

DESCRIPTION OF CERTAIN EMBODIMENTS

An Image Processing Apparatus

Figure 1:
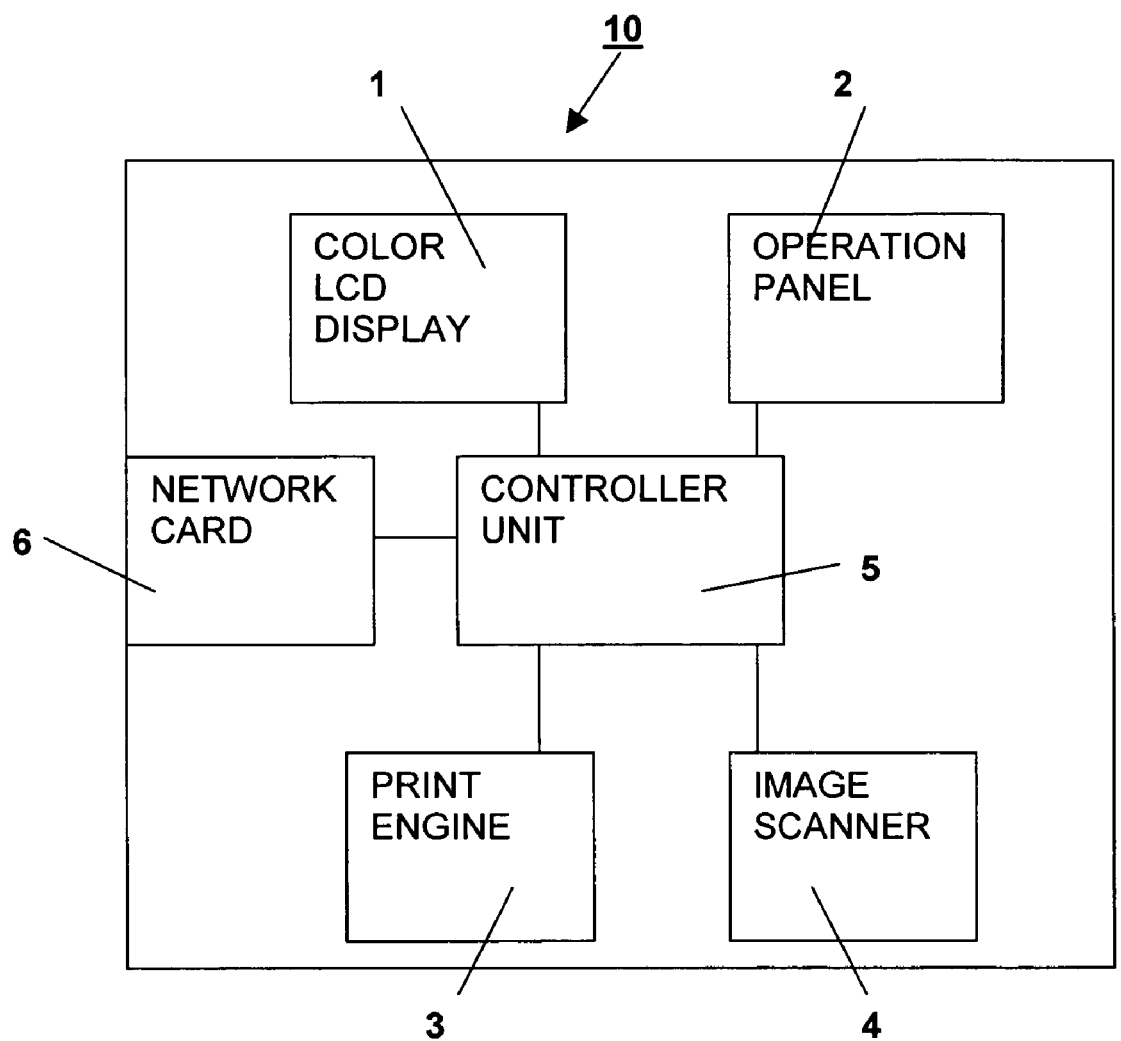
FIG. 1 illustrates a block diagram of an image processing apparatus according to certain embodiments.

An image processing apparatus can match at least two images including a text, a first image data and a second image data, having at least some overlap area including text. In certain embodiments, the image processing apparatus can match more than two images.

The image data is a color, a grayscale or a black and white bitmap image data of an image including text.

Examples of the image processing apparatus for matching two documents consistent with certain embodiments of the invention include, but are not limited to, a personal computer (PC) with an application software for matching two images, a digital camera, an image scanner, a digital copying apparatus and a multi functional printer (MFP). The digital copying apparatus and the multi functional printer can print by a way of a laser beam printing with toners, an ink jet printing with ink, a thermal printing with thermal dye and/or a silver halide printing with silver halide light sensitive material.

The image processing apparatus can comprise a control unit, a text segment finding unit, a common text finding unit, a feature point finding unit and/or an image combining unit. The image processing apparatus can further comprise an input unit, an image reading unit and/or a display unit. The image processing apparatus can further comprise a print unit, a storing unit and/or a transmit unit.

In certain embodiments, the application software including an OCR software for matching two images can be installed into the image processing apparatus. In certain embodiments, the application software and/or the OCR software can be recorded in a computer readable medium. Examples of the computer readable medium consistent with certain embodiments of the invention include, but are not limited to, a digital memory card, a compact disk (e.g., CD-R, CD-RW, etc.), and a digital versatile disk (e.g., DVD-R, DVD-RW, DVD+RW, etc.). Various types of digital memory cards compatible with certain embodiments of the invention include, but are not limited to, a secure digital (SD) memory card, Compact Flash™, Smart Media™, Memory Stick™, and the like.

In certain embodiments, the control unit can control the entire system of the image processing apparatus and/or the various units in the image processing apparatus. The control unit can run various software including the application software for matching two images. The control unit can process and/or calculate several data. Examples of the control unit consistent with certain embodiments of the invention include, but are not limited to, a central processing unit (CPU) or a micro processing unit (MPU) with a memory and the application software necessary for the processing, and an integrated circuit (IC), an application specific integrated circuit (ASIC), a field programmable gate array (FPGA) and a programmable logic device (PLD). Examples of the memory consistent with certain embodiments of the invention include, but are not limited to, a random access memory (RAM) including NVRAM, M RAM, P RAM, Fe RAM, Flash RAM, and a read only memory (ROM).

In certain embodiments, the image reading unit can obtain the first image data and the second image data. In certain embodiments, the image reading unit can scan an original first image and an original second image and obtain the first image data and the second image data. In certain embodiments, the image reading unit can read a removable data recording medium in which the first image data and the second image data are recorded, and obtain the first image data and the second image data. In certain embodiments, the image reading unit can receive the first image data and the second image data transmitted from the other device connected with the image processing apparatus through a network (e.g., a local area network, an internet, a wide area network and the like), and obtain the first image data and the second image data. Examples of the image reading unit consistent with certain embodiments of the invention include, but are not limited to, an image scanner, a removable data recording medium recorder/reader, a network card and a LAN adaptor. Examples of a removable data recording medium for the removable data recording medium recorder/reader include, but are not limited to, the digital memory card, the compact disk (e.g., CD-R, CD-RW, etc.), and the digital versatile disk (e.g., DVD-R, DVD-RW, DVD+RW, etc.).

In certain embodiments, the display unit can display various images and texts including the first image, the second image, the combined image, the instruction of the image matching, the warning message showing combining two images is impossible and the like. Examples of the display unit consistent with certain embodiments of the invention include, but are not limited to, a liquid crystal display (LCD), a Braun tube, a cathode ray tube (CRT) and a plasma display panel.

In certain embodiments, the user can input various data, information, response or instruction (e.g., a selection of image matching mode, an instruction to start scanning and/or printing and the like) to the image processing apparatus through the input unit of the image processing apparatus. Examples of the input unit consistent with certain embodiments of the invention include, but are not limited to, a keyboard, a mouse, a push button, a touch panel and an operation panel.

In certain embodiments, the transmit unit can transmit various data (e.g., the combined image data and the like) and various signal from the image processing apparatus to the other device connected to the image processing apparatus, and receive various data (e.g., the first image data, the second image data and the like) and various signal from the other device connected with the image processing apparatus. Examples of the transmit unit consistent with certain embodiments of the invention include, but are not limited to, a LAN adapter, a modem and a network card.

In certain embodiments, the storing unit can store several software including the application software comprising the OCR software for matching two images. In certain embodiments, the storing unit can store several data including the first image data, the second image data, the combined image data, the scene segment including the text segment and the image segment, the text data, the common text data, the feature point and the like. Example of the storing unit consistent with certain embodiments of the invention include, but are not limited to, a hard disk, a memory (e.g., a RAM including NVRAM, M RAM, P RAM, Fe RAM, Flash RAM, and a ROM) and a removable data recording medium recorder/reader.

In certain embodiments, the print unit can print the combined image, the first image and/or the second image on a recording sheet. For instance, the recording sheet can be a paper, OHP film and so on. Examples of the print unit consistent with certain embodiments of the invention include, but are not limited to, an image forming unit or a print engine for the laser beam color MFP or the color LBP, an ink jet head of the color IJP and a thermal head of the color thermal printer. In certain embodiments, the print engine or the image forming unit can comprise a laser beam scanning unit, a photo-sensitive drum (in other words, a photoconductor), a cleaning unit, an eraser lamp, a charging charger, a developing device, a transmit charger and so on. In certain embodiments, the image forming unit or the print engine for the color LBP, the color laser beam MFP can comprise one laser beam scanning unit and several imaging units corresponding to each color of C (cyan), M (magenta), Y (yellow) and K (black) and comprising the photo-sensitive drum, the cleaning unit, the eraser lamp, the charging charger, the developing device, the transmit charger and so on.

In certain embodiments, the text segment finding unit can divide the first image data into several scene segments, can divide the second image data into several scene segment and can detect a text segment among the scene segments of the first image data and the second image data. The scene segment can include an image segment which consists of images and a text segment which includes text. In certain embodiments, the scene segment can comprise any other kind of segments. In certain embodiments, the text segment finding unit can deem a part of the first image data or the second image data as the text segment according to the application software, if the part of the first image data or the second image data has several high-contrast images whose sizes are about the same and which lines in a straight line. In certain embodiments, the text segment can be detected by extracting 8 or 4 connected component (or connected pixel), framing up and analyzing the size, the lining up of the frame. If the scene segments can be divided into only two kinds of segment, the text segment and the image segment, the text segment finding unit can deem the rest of the first image data or the second image data other than the text segment as the image segment. By doing the above, the text segment finding unit can detect the text segments and the image segment of the first image data and the second image data.

In certain embodiments, the common text finding unit can detect text data included in the text segments of the first image data and the second image data which are bitmap image data. The common text finding unit can detect the text data included in the text segments according to the OCR software.

After detecting the text data, the common text finding unit can compare the text data included in the text segments in order to decide the common text data according to the application software. The common text data finding unit can deem the text data in the text segments as the common text data if the text data in the text segments have at least predetermined number of same characters (which can include a space) in series. The predetermined number of the same characters can be set in the user's discretion. As a result of comparison by the common text data finding unit, the common text data finding unit can decide the common text data.

In certain embodiments, the feature point finding unit can extract feature points of the text segments or the image segments of the first image data and the second image data based on the common text data. The feature point finding unit can extract feature points from the common text of the first image data and the second image data. In certain embodiments, the feature point finding unit can extract feature points from the portion of the text segment other than the common text. In certain embodiments, the feature point finding unit can extract feature points from the image segment. In certain embodiments, the feature point finding unit can extract feature points from the image segment which is close to the text segment. Preferably, the feature point finding unit can extract several feature points. In certain embodiments, the feature point finding unit can extract the feature point finding unit can extract the feature point according to the algorithm of homography.

In certain embodiments, the document combining unit can combine the first image data and the second image data according to the feature points. The image combining unit can combine the first image data and the second image data so that the feature points of the first image data can superimpose on the feature points of the second image data.

Examples of the text segment finding unit, the common text data finding unit, the feature point finding unit and the image combining unit with certain embodiments of the invention include, but are not limited to, a CPU or a MPU with a memory and the application software necessary for the processing, and an IC, an ASIC, a FPGA and a PLD. The text segment finding unit, the common text data finding unit, the feature point finding unit and the image combining unit can be integrated into one device or can be divided into several devices. Each of the text segment finding unit, the common text data finding unit, the feature point finding unit and the image combining unit can comprise several devices. The text segment finding unit, the common text data finding unit, the feature point finding unit and/or the image combining unit can be integrated with the control unit.

In case that the first image data and/or the second image data is skew, the text segment finding unit, the common text data finding unit, the feature point finding unit and/or the image combining unit can correct the skew of the first image data and/or the second image data.

EXAMPLE

One example of the method and the apparatus for matching several images and/or photos including text is described in the following. This invention is not limited to the following example.

In this embodiments, the image processing apparatus is a color multi function printer (MFP) 10. The color MFP 10 can have a function of a copying apparatus, a function of a printer and a function of a scanner. The color MFP 10 can print in color utilizing color toners of C(cyan), M(magenta), Y(yellow) and K(black). In certain embodiments, as illustrated in FIG. 1, the color MFP 10 can comprise the display unit (e.g., a color LCD display 1), the input unit (e.g., an operation panel 2), the print unit (e.g., a print engine 3), the image reading unit (e.g., an image scanner 4), the transmit unit (e.g., a network card 6), the control unit (e.g., a controller unit 5 comprising a CPU, a ROM and a RAM), the text segment finding unit (e.g., the controller unit 5), the common text data finding unit (e.g., the controller unit 5), the feature point finding unit (e.g., the controller unit 5) and the image combining unit (e.g., the controller unit 5). In this example, the control unit, the text segment finding unit, the common text data finding unit, the feature point finding unit and the image combining unit can be integrated into one controller unit 5. The print engine 3 can comprise four photoconductors for each of C, M, Y, and K and a laser emitting device. The application software for matching two images including the optical character reader (OCR) software can be stored in the ROM and/or the RAM of the controller unit 5.

Figure 2A:
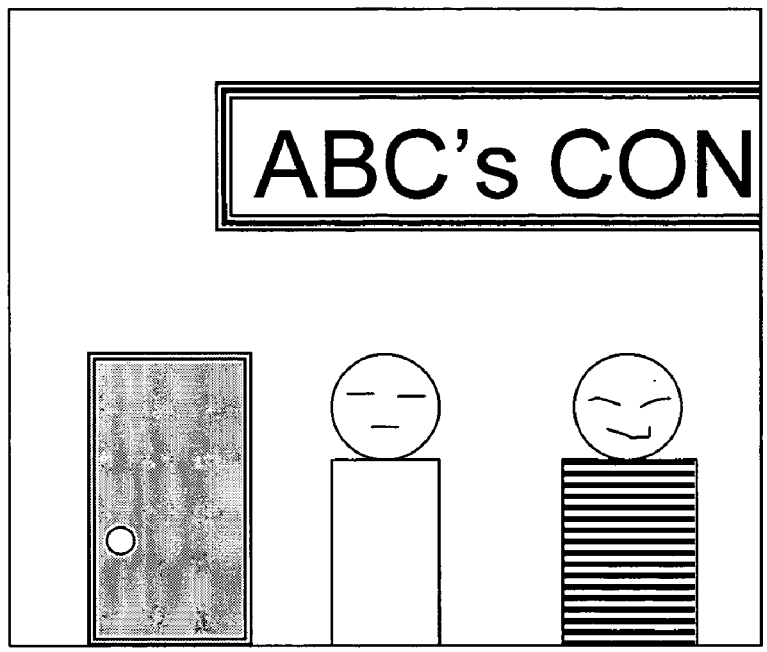
FIGS. 2(a) and (b) illustrate a first image data and a second image data according to certain embodiments.
Figure 2B:
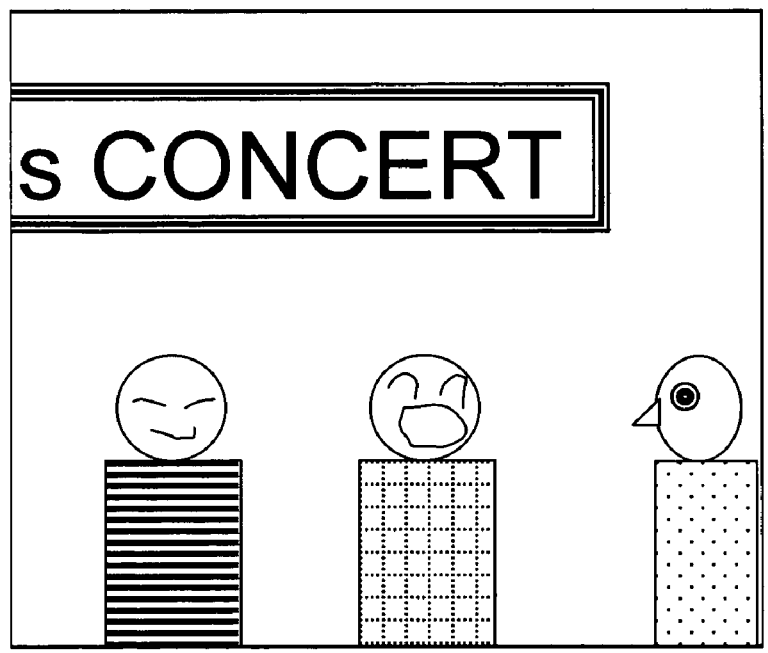

In this example, a first photo 11 and a second photo 12 can be combined into one photo. As illustrated in FIGS. 2(a) and (b), the two images, the first photo 11 and the second photo 12 can have an overlap area including texts. Each of the first photo 11 and the second photo 12 shows a part of a bigger photo.

Figure 6:
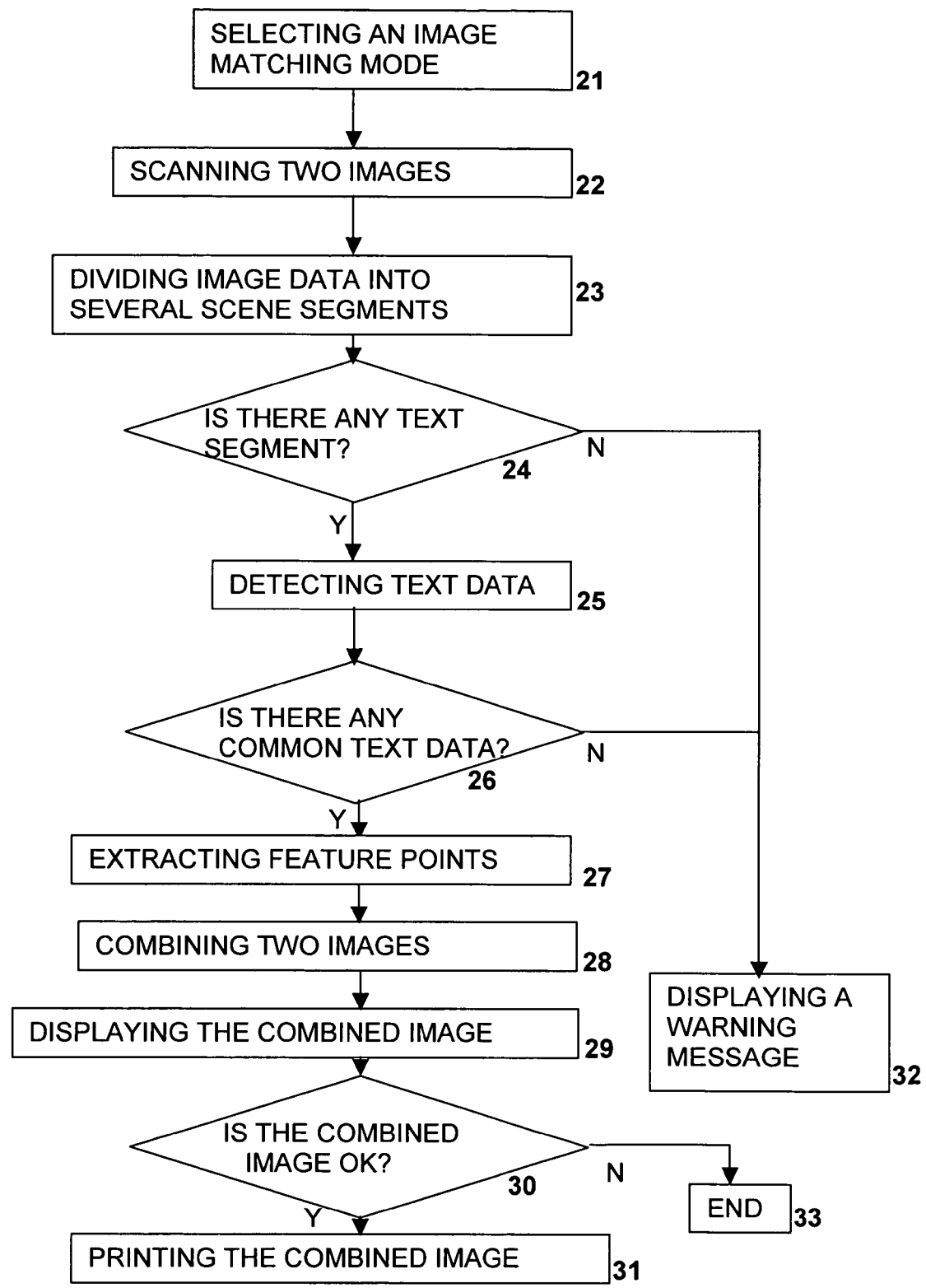
FIG. 6 illustrates a flowchart describing the matching of two images according to certain embodiments.

If the user wants to combine two photo images into one photo image by the color MFP 10, the user can select "an image matching mode" by the operation panel 2. (21 in FIG. 6) In certain embodiments, the instruction about how to combine two images can be displayed on the color LCD display 1 and the user can follow the instruction.

The first photo 11 and the second photo 12 can be scanned by the image scanner 4 of the color MFP 10. (22 in FIG. 6) By the scanning, the first image data and the second image data which are bitmap image data can be obtained. The first image data 11 and the second image data 12 can be stored in the RAM of the controller unit 5. The first image data 11 and the second image data includes images and texts.

The controller unit 5 as the text segment finding unit can divide the first image data 11 into several scene segments.

The scene segment can include an image segment which consists of images and a text segment which includes text. The scene segment can comprise any other kind of segments.

Figure 3A:
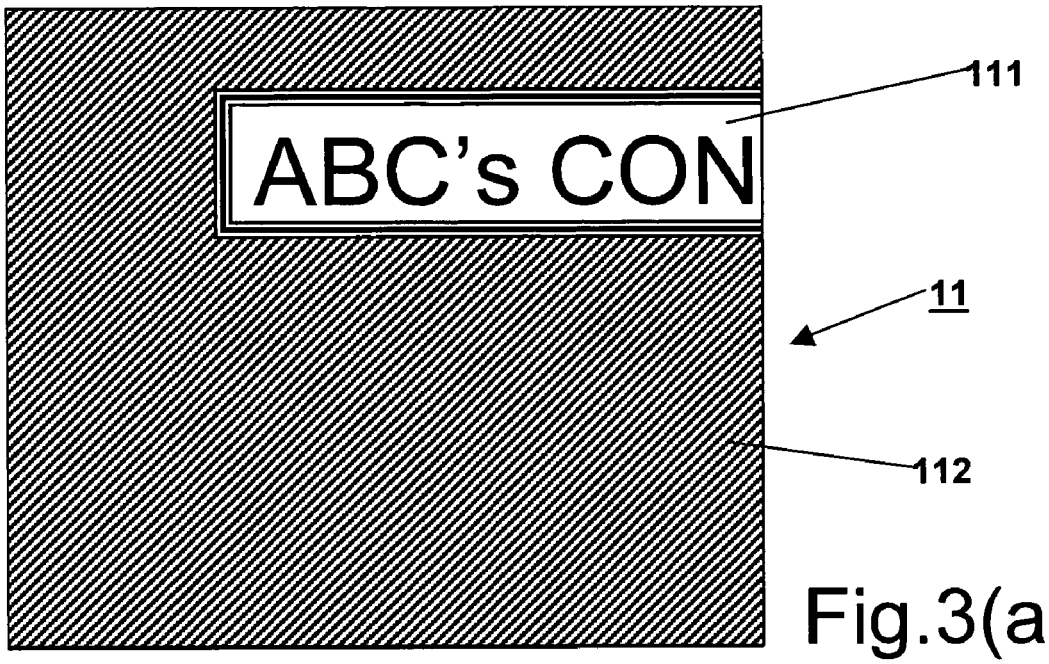
FIGS. 3(a) and (b) illustrate a layout feature of first image data and a layout feature of a second image data according to certain embodiments.
Figure 3B:
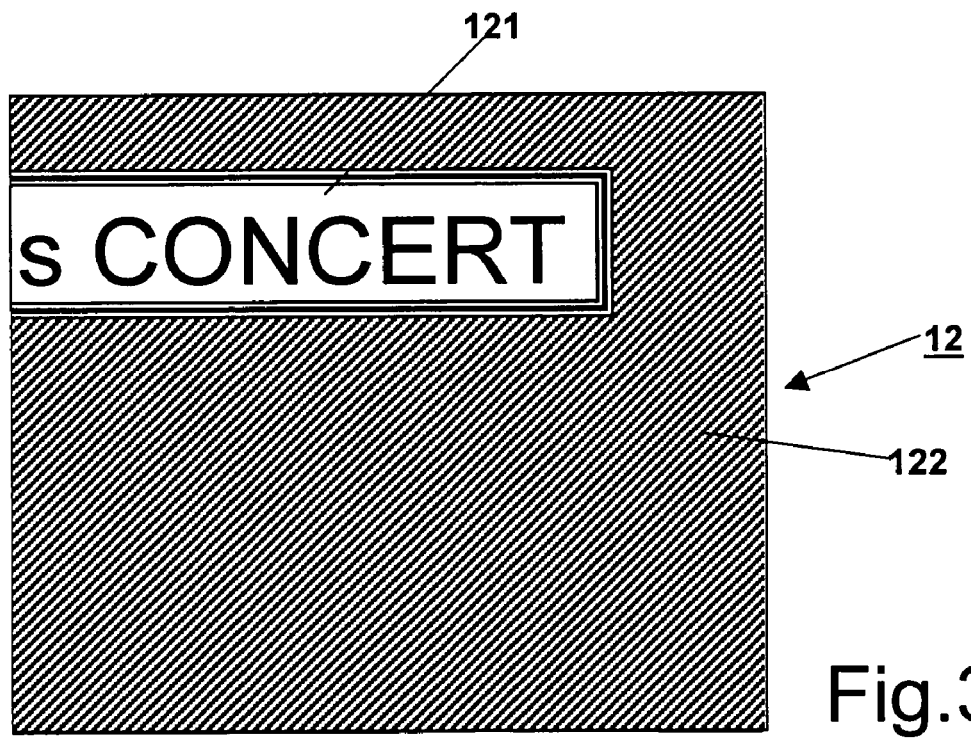

The controller 5 can deem a part of the first image data as the text segment according to the software stored in the controller unit 5, if the part of the first image data has several high-contrast images whose sizes are about the same and which lines in a straight line. In certain embodiments, the text segment can be detected by extracting 8 or 4 connected component (or connected pixel), framing up and analyzing the size, the lining up of the frame. By doing the above, the controller 5 can detect the text segment. In this example, the scene segment can be divided into only two kinds of segment, the text segment and the image segment. Therefore, the controller 5 can deem the rest of the first image data other than the text segment as the image segment. As illustrated in FIGS. 3(a) and (b), the controller 5 can divide the first image data 11 into several scene segments and detect the text segment 111 and the image segment 112. (23, 24 in FIG. 6)

The detected text segments 111, 121 and the image segments 112, 122 can be stored in the RAM of the controller unit 5.

If the controller 5 judges there is no text segment in the first image data or the second image data, the color LCD display 1 can display a warning message stating that it is impossible to combine the two images. (32 in FIG. 6) Then, the controller unit 5 as the common text finding unit can detect text data included in the text segments 111, 121 of the first image data and the second image data which are the bitmap image data according to the OCR software stored in the controller unit 5. (25 in FIG. 6) In this example, the controller unit 5 can detect the text data "ABC's CON" included in the text segment 111 of the first image data 11 and the text data "s CONCERT" included in the text segment 121 of the second image data 12. The detected text data can be stored in the RAM of the controller 5.

After detecting the text data, the controller 5 can compare the text data included in the text segments in order to decide the common text data according to the application software stored in the RAM of the controller 5. (26 in FIG. 6) In this example, the controller 5 can deem the text data in the text segments 111 and 121 as the common text data if the text data in the text segments have at least two (2) same characters in series.

Figure 4A:
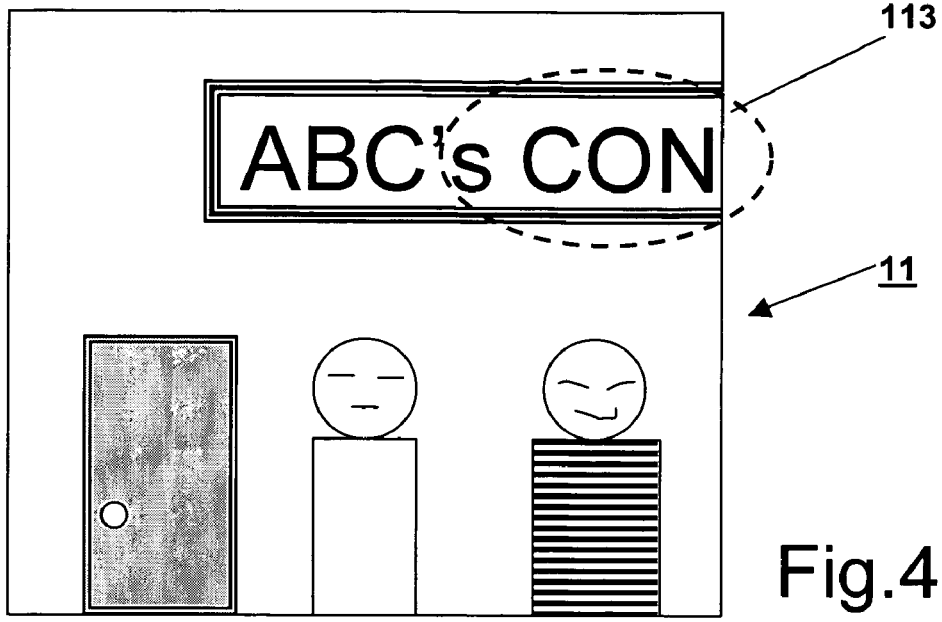
FIGS. 4(a) and (b) illustrate common text data according to certain embodiments.
Figure 4B:
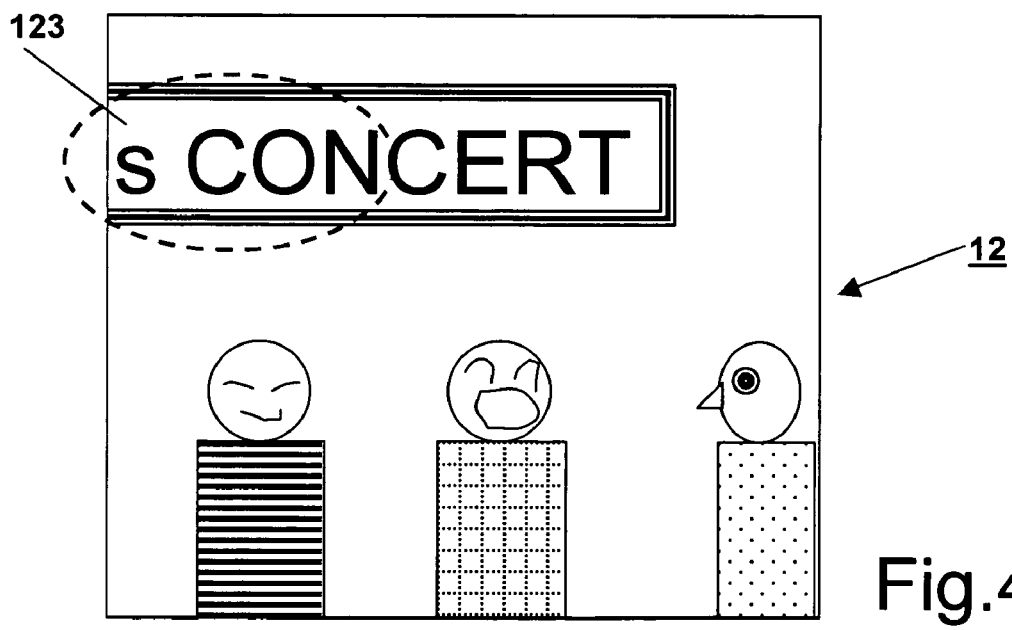

As a result of comparison by the controller 5, the controller 5 can find that the text segment 111 of the first image data 11 and the text segment 121 of the second image data 12 have the common text data which is "s CON" 113, 123 as illustrated in FIGS. 4(a) and (b). The common text data can be stored in the RAM of the controller 5.

If the controller 5 judges there is no common text data between the text segment in the first image data and the text segment in the second image data, the color LCD display 1 can display a warning message stating that it is impossible to combine the two images. (32 in FIG. 6)

After finding the common text data, the controller 5 as the feature point finding unit can extract the feature point from the common text data or some portion of the text segment according to the application software stored in the RAM of the controller 5. (27 in FIG. 6) Preferably, the several feature points can be extracted. The feature points of the text segment can be found according to the algorithm of homography. The feature points can be stored in the RAM of the controller unit 5.

After extracting the feature point, the controller unit 5 as the image combining unit can combine the first image data 11 and the second image data 12 according to the feature points. (28 in FIG. 6) The controller unit 5 can combine the first image data 11 and the second image data 12 by superposing the feature points in the common text data 113 or some portion of the text segment of the first image data 11 with the feature points in the common text data 123 or some portion of the text segment of the second image data 12. More feature points in the image segments can be used for combining the first document data and the second document data. By superposing several feature points, it is possible to combine two image data correctly.

Figure 5:
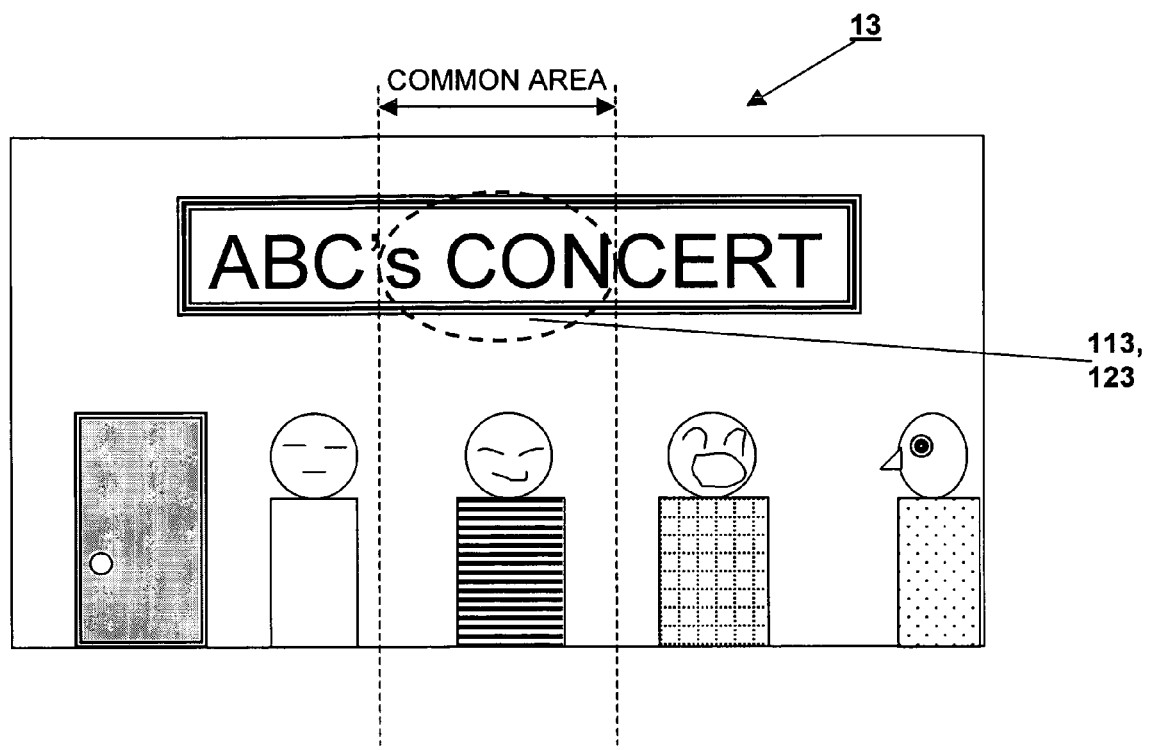
FIG. 5 illustrates a combined image data according to certain embodiments.

As illustrated in FIG. 5, the combined image 13 100 which is a bitmap image data can be obtained by combining the first image data 11 and the second image data 12 according to the feature points. The combined document 13 can be stored in the RAM of the controller unit 5 and be displayed on the color LCD display 1. (29 in FIG. 6)

After the user confirms the combined image 13 on the color LCD display 1, the user can instruct to start to print the combined image 13 from the operation panel 2 if the user is satisfied with the combined image 13. (30 in FIG. 6) If the user instructs to start to print the combined image 13, the controller unit 5 can transmit the combined image data from the RAM to the print engine 3 and make the print engine 3 print the combined image 13 in color image. (31 in FIG. 6) For printing, the conventional way can be applied. If the user is not satisfied with the combined image 13, the user can instruct to finish the image processing from the operation panel 2 and the process ends. (33 in FIG. 6)

While the color MFP is utilized as the image processing apparatus to combine two image data, the other device can be utilized as the image processing apparatus. In certain embodiments, the image scanner can combine two image data like the above. In certain embodiments, the personal computer (PC) including the application software for matching images can combine two image data like the above.

Figure 7A:
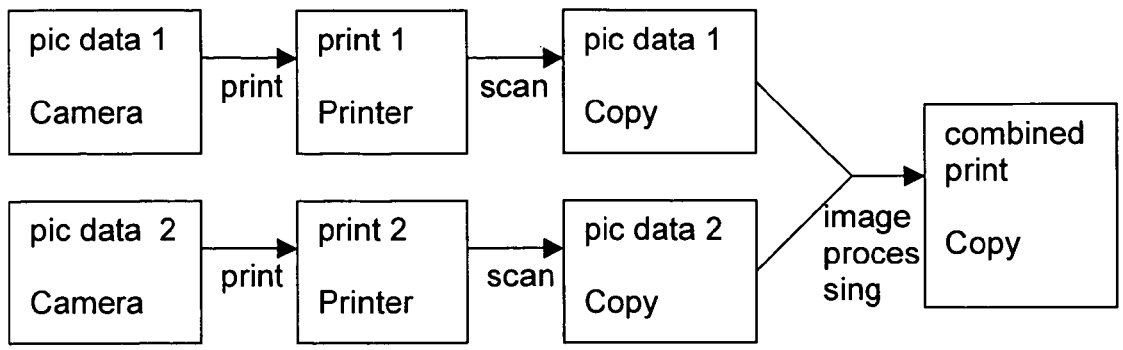
FIGS. 7(a), (b) and (c) illustrates a flow of data according to certain embodiments.

In certain embodiments, if the first image data and the second image data are taken by the digital camera, as illustrated in FIG. 7(a), the first image and the second image can be printed according to the first image data and the second image data by the printer. Then, the copying apparatus can scan the printed first image and second image to obtain the first image data and the second image data. After that, the copying apparatus can combine the first image data and the second image data by the way stated in the above, make the combined image data and print the combined image data.

Figure 7B:
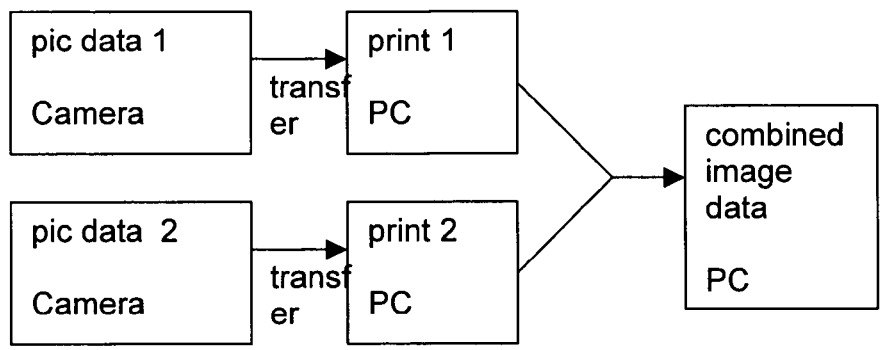

In certain embodiments, if the first image data and the second image data are taken by the digital camera, as illustrated in FIG. 7(b), the first image data and the second image data can be transferred to the PC including the software for matching two images. Then, the PC can combine the first image data and the second image data by the way stated in the above and make the combined image data.

Figure 7C:
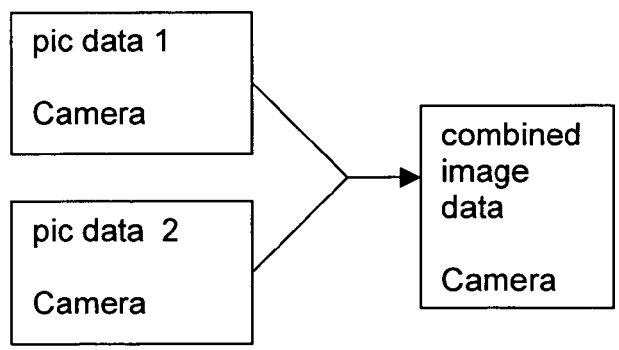

In certain embodiments, if the first image data and the second image data are taken by the digital camera, as illustrated in FIG. 7(c), the digital camera can include the software for matching two images, combine the first image data and the second image data by the digital camera by the way stated in the above and make the combined image data.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer readable medium containing a computer program for matching two images including text, first image data and second image data, the two images having areas of overlapping text, the program containing instructions for directing the computer to execute a method including the steps of:
    dividing the first image data into a plurality of scene segments and dividing the second image data into a plurality of scene segments;
    finding a text segment among the scene segments of the first image data and second image data;
    detecting common text data in the text segments of the first image data and the second image data, the common text data having identical text data in the text segments of the first image data and the second image data;
    extracting feature points from the first image data and the second image data based on the common text data;
    combining the first image data and the second image data according to the feature points.

2. The method of claim 1, wherein finding the text segment comprises identifying the scene segment having a contrast higher than a predetermined value and a plurality of high contrast lining images of similar size as the text segment.

3. The method of claim 1, wherein detecting text data comprises performing an OCR algorithm.

4. The method of claim 1, wherein extracting feature points comprises performing a homography algorithm.

5. An image processing apparatus for matching two images including text, first image data and second image data, the two images having areas of overlapping text, comprising:
    an input unit capable of receiving instructions for matching the two images;
    an image reading unit, the image reading unit obtaining the two images;
    a control unit, the control unit comprising:
        a text segment finding unit which divides the first image data and second image data into a plurality of scene segments, and detects a text segment among the scene segments of the first image data and second image data;
        a common text data finding unit which detects common text data in the text segments of the first image data and the second image data, the common text data having identical text data in the text segments of the first image data and the second image data;
        a feature point finding unit which extracts feature points from the first image data and the second image data based on the common text data, and
        an image combining unit which combines the first image data and the second image data according to the feature points; and
    a print unit capable of printing the combined image.

* * * * *